United States Patent
Ramsdell

(10) Patent No.: US 9,285,606 B1
(45) Date of Patent: Mar. 15, 2016

(54) DEVICE FOR POSITIONING EYEGLASS FRAMES

(71) Applicant: Alice H. Ramsdell, Mableton, GA (US)

(72) Inventor: Alice H. Ramsdell, Mableton, GA (US)

( * ) Notice: Subject to any disclaimer, the term of this patent is extended or adjusted under 35 U.S.C. 154(b) by 0 days.

(21) Appl. No.: 14/540,169

(22) Filed: Nov. 13, 2014

(51) Int. Cl.
*G02C 3/00* (2006.01)
*G02C 7/06* (2006.01)

(52) U.S. Cl.
CPC . *G02C 3/003* (2013.01); *G02C 7/06* (2013.01)

(58) Field of Classification Search
CPC ........... G02C 3/003; G02C 3/006; G02C 3/02
USPC ................. 351/155, 156; D16/300, 304, 311; 2/410, 422, 11, 12, 13
See application file for complete search history.

(56) References Cited

U.S. PATENT DOCUMENTS

| | | | |
|---|---|---|---|
| 104,216 A | 6/1870 | Sickels | |
| 1,118,719 A | 11/1914 | Wirth | |
| 4,152,051 A | 5/1979 | Van Tiem | |
| D282,548 S | 2/1986 | Shells | |
| D374,114 S | 10/1996 | Arroyo | |
| 5,647,061 A | 7/1997 | Marcus | |
| 5,729,321 A * | 3/1998 | Wielhouwer | G02C 7/10 2/431 |
| D403,295 S | 12/1998 | Baldwin | |
| 6,089,709 A * | 7/2000 | Fairclough | G02C 3/003 351/103 |
| D431,042 S * | 9/2000 | Lin | D16/300 |
| D462,979 S | 9/2002 | Fairclough | |
| 8,454,156 B2 | 6/2013 | Frank | |
| 2010/0157238 A1* | 6/2010 | Frank | G02C 3/02 351/155 |
| 2012/0002158 A1* | 1/2012 | Jirsa | G02C 1/02 351/52 |
| 2012/0008087 A1 | 1/2012 | Franklin | |

* cited by examiner

*Primary Examiner* — Darryl J Collins
(74) *Attorney, Agent, or Firm* — Elizabeth Harrell; Moore Ingram Johnson & Steele

(57) ABSTRACT

A head-mounted ergonomic device for users of multifocal lens eyeglasses that supports the multifocal lens eyeglass frames and allows the user to achieve optimal lens power by manually adjusting the device to alter the level and/or angle of the multifocal lens eyeglass frames.

20 Claims, 1 Drawing Sheet

DEVICE FOR POSITIONING EYEGLASS FRAMES

FIELD OF THE INVENTION

The present invention relates to a device for users of multifocal lens eyeglasses that allows the user to achieve optimal lens power by manually adjusting the position of the eyeglass frames.

BACKGROUND

Users of multifocal lens eyeglasses, including but not limited to bifocal, trifocal, varifocal, graduated prescription, progressive addition, progressive power, and progressive spectacle lenses, learn to move their head or the level and distance of reading material, rather than the eyes, to achieve the optimal lens power, or lens strength, required for viewing an object. Users of multifocal lens eyeglasses often experience muscle fatigue particularly when using a computer, reading sheet music or any other reading material or object being viewed. Such fatigue can include eye, neck and shoulder strain. Many users of multifocal lens eyeglasses purchase, at great expense, additional pairs of eyeglasses with single vision lenses to avoid fatigue when participating in activities that would require them to move their head for optimal lens power.

Devices for supporting eyeglasses have been previously proposed and include devices to keep the eyeglasses off the bridge of the nose and ears as well as devices to prevent eyeglasses from slipping during physical activity. However, these devices are designed to keep the eyeglasses stationary and do not alter the lens position with respect to the eye of the wearer.

Accordingly, there is a need for a device that allows the user to raise or lower the frame of existing multifocal lens eyeglasses to achieve optimal lens power that can be easily adjusted without the need for tools, does not require special lenses or frames, and is unobtrusive to the face and coiffure.

SUMMARY OF THE INVENTION

The present invention provides for a lightweight adjustable band with a support arm, or hook, that rests against the forehead while the band firmly grasps the side of the head above the ears of a wearer of multifocal lens eyeglasses. The band is intended to be worn simultaneously with pre-existing multifocal lens eyeglasses. The bridge of the frames of the pre-existing multifocal lens eyeglasses rests on the hook. To achieve optimal lens power without neck strain, the level of the hook is altered to adjust the level and/or angle of the frames of the pre-existing multifocal lenses.

In a preferred embodiment, the band comprises a left gripping arm comprising a proximal end and a distal end, a right gripping arm comprising a proximal end and a distal end, and an extension comprising a top and bottom, wherein the proximal end of the left gripping arm, the proximal end of the right gripping arm and the top of the extension create a joint. In a preferred embodiment, the joint is a Y-shape which allows for a better fit at the forehead, however, it is understood that the joint may be any shape. Upon wearing the band, the joint engages the forehead of the wearer, the gripping arms extend from the forehead across the sides of the head just above and behind the ears, and the bottom of the extension is directed towards the bridge of the nose. It is understood that the gripping arms do not touch the ears of the wearer and do not touch or interfere with the arms of the frames of the pre-existing multifocal lens eyeglass frames.

The band further comprises a support arm, or hook, protruding from the bottom of the extension to support the frame of the multifocal lens eyeglasses thereon. The hook further comprises a bottom and a front. In a preferred embodiment, the bottom extends away from the face of the wearer and supports the bridge of the frame of the pre-existing multifocal lens eyeglasses and the front is approximately parallel to the extension to prevent the eyeglasses from falling off the hook. The hook may be a curved planar hook, or any other shape that provides support for the frame of the pre-existing multifocal lens eyeglasses. In a further embodiment of the present invention, the support arm may be fixed to the band or detachable.

It is understood that the device grips the head, but does not encircle the head of the wearer to allow for ease in placing and removing the device as well as adjusting the device to achieve optimal lens power. Once the device is placed on the head, preferably above the eyebrows, the joint and extension engage the forehead of the wearer, and the hook rests above the bridge of the nose of the wearer. Adjustment of the lens power of pre-existing multifocal lenses is easily achieved by placing the bridge of the glasses on the hook of the device and simply manually moving the hook up or down the forehead thereby adjusting the level and/or the angle of the lenses. The adjustment may be minor and may be made quickly without any tools. While the adjustment is taking place, it is understood that the gripping bands will adjust accordingly while still gripping the head, eliminating the need to readjust the band or to remove the band as a whole for adjustment. In another embodiment, the device, while not in use, may be worn around the neck of the wearer.

In a preferred embodiment, each gripping arm measures approximately 17.7 cm long, the extension measures approximately 3.5 cm, the hook bottom extends approximately 1.27 cm from the face of the wearer and the front of the hook is approximately 0.97 cm.

It is understood that the components of the band are preferably made from an adjustable lightweight metal, plastic, composite material or combination thereof such that the left gripping arm and right gripping arm may be spread greater than the width of the wearer's head to place and remove the band, but grip the wearer's head once in place. The components may be further coated with a protective cover such as rubber or nylon. It is understood that the device may be fowled or shaped from a single piece of adjustable material or several different pieces attached together to form the device.

In an embodiment wherein the device is formed from a single piece of adjustable material, the extension may be created from the left and right gripping arms engaging by twisting, touching, flexibly coupling or any other manner from the joint to at least the bottom of the extension; the material may then continue in the same manner to form the hook, or the material may disengage, or uncouple at the bottom of the extension to form a planar hook. In a further embodiment, the device may be formed by a single piece of adjustable material wherein the left gripping arm and right gripping arm bend or curve to form the joint but do not engage and form the extension in a parallel from the joint to at least the bottom of the extension.

In a further embodiment, the distal ends of the gripping arms may include band tips at the distal ends of the gripping bands creating a comfortable contact area between the head of the wearer and the gripping arms. The band tips may be made of any suitable material, such as, but not limited to silicone, plastic and hard acetate. The band tips may be fixed at the distal ends of the gripping bands or removable. In another preferred embodiment, a cushioning material may be placed at the joint of the left gripping band, right gripping band and extension. The cushioning material may be made of any suitable material, such as, but not limited to silicone, acetate, foam or any other suitable material. The cushioning material may be fixed to the device or removable.

Other aspects, features, and advantages will become apparent to those skilled in the art from the detailed description and accompanying drawings. It should be understood, however, that the detailed description and accompanying drawings, while indicating preferred embodiments of the present invention, are given by way of illustration and not limitation.

DETAILED DESCRIPTION OF THE INVENTION

Figure 1:
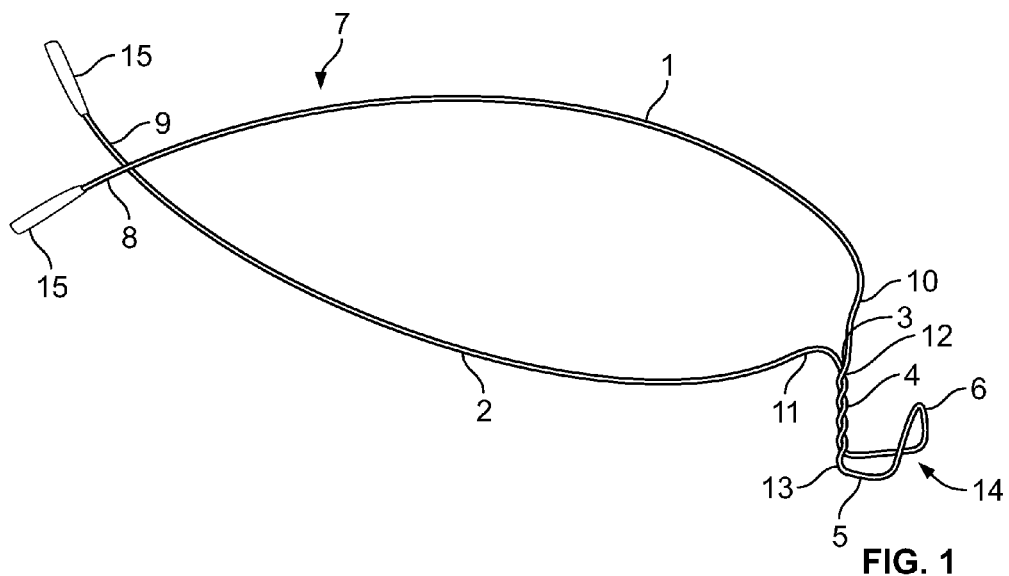
FIG. 1 is a perspective view of an embodiment of the present invention.

FIG. 1 illustrates an embodiment of the eyeglass frame positioning device of the present invention. The device 7 comprises a left gripping arm 1 having a distal end 8 and a proximal end 10, a right gripping arm 2 having a distal end 9 and a proximal end 11 and an extension 4 having a top 12 and a bottom 13. The proximal end 10 of the left gripping arm 1, the proximal end 11 of the right gripping arm 2 and the top 12 of the extension 4 form a Y-shape joint 3. A hook 14 extends from the bottom 13 of extension 4. The hook 14 comprises a bottom 5 and a front 6 such that front 6 is approximately parallel to extension 4. Band tips 15 may be placed at the distal end 9 of gripping arm 2 and the distal end 8 of left gripping arm 1. In the embodiment of the eyeglass frame positioning device illustrated in FIG. 1 the left gripping arm 1, right gripping arm 2, extension 4 and hook 14 are created from a single piece of adjustable material. The left gripping arm 1 and right gripping arm 2 curve slightly to form a Y-shape at joint 3. At joint 3, extension 4 is created by flexibly coupling the material of left gripping arm 1 and right gripping arm 2. At the bottom 13 of extension 4, the material is uncoupled to form hook 14.

Figure 2:
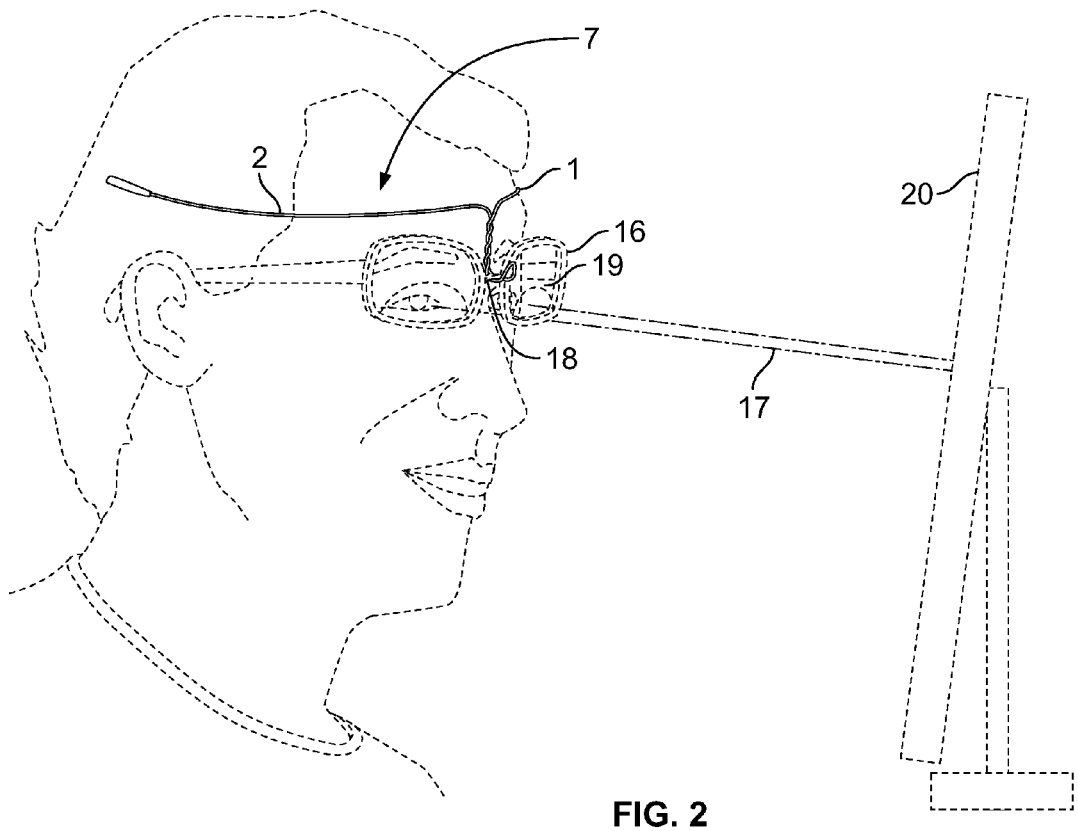
FIG. 2 is perspective of the device of the present invention used to adjust the level of the frames of pre-existing multifocal lens eyeglasses for optimal lens power while the wearer of the device is using a computer.

FIG. 2 illustrates device 7 in use by a wearer of pre-existing multifocal lens eyeglass frames 16 comprising lenses 19 and a bridge 18, while wearer is using a computer 20. The left gripping arm 1 and right gripping arm 2 grasp the head of the wearer above and behind the ears of the wearer and the extension 4 engages the forehead of the wearer. The device 7 does not engage the ears of the wearer. The bridge 18 is placed on the hook 14, which raises the level of lenses 19 allowing the wearer a line of sight 17 that allows for optimal lens power for viewing the computer 20 without having to adjust neck position or the position of the computer 20. The level and/or angle of lenses 19 may be adjusted by simply manually raising or lowering hook 14.

I claim:

1. A device to adjust a pair of pre-existing multifocal lens eyeglass frames on a head of a wearer, comprising:
an adjustable band adapted to engage the head of the wearer comprising:
a left gripping arm having a proximal end and a distal end and a right gripping arm having a proximal end and a distal end, wherein the distal end of the right gripping arm and the distal end of the left distal gripping arm grip the head of the wearer without engaging the ears of the wearer, and
an adjustable extension engaging the forehead of the wearer comprising a top and a bottom, wherein the bottom of the extension is directed towards the bridge of the nose of the wearer, and wherein the proximal end of the left gripping arm, the proximal end of the right gripping arm and the top of the extension form a joint and the bottom of the extension further comprises a hook extending from the bottom of the extension to support a bridge of the pair of pre-existing multifocal lens eyeglass frames.

2. The device of claim 1 further comprising a band tip attached to the distal end of the left gripping arm and a band tip attached to the distal end of the right gripping arm.

3. The device of claim 2 wherein the band is comprised of single piece of flexible material.

4. The device of claim 1 wherein the band is comprised of a single piece of flexible material.

5. The device of claim 4 wherein the left gripping arm and right gripping arm engage at the joint to form the extension.

6. The device of claim 1 wherein the joint is Y-shaped.

7. The device of claim 6 further comprising a band tip attached to the distal end of the left gripping arm and a band tip attached to the distal end of the right gripping arm.

8. The device of claim 7 wherein the band is comprised of single piece of flexible material.

9. The device of claim 6 wherein the band is comprised of a single piece of flexible material.

10. The device of claim 9 wherein the left gripping arm and right gripping arm engage at the joint to form the extension.

11. The device of claim 1 wherein the extension further comprises a length, wherein the length is approximately 3.5 centimeters.

12. A method to adjust a pair of pre-existing multifocal lens eyeglass frames on a head of a wearer, comprising:
(a) placing an adjustable band adapted to engage the head of the wearer comprising;
a left gripping arm having a proximal end and a distal end and a right gripping arm having a proximal end and a distal end, wherein the distal end of the right gripping arm and the distal end of the left distal gripping arm grip the head of the wearer without engaging the ears of the wearer, and
an adjustable extension engaging the forehead of the wearer further comprising a top and a bottom, wherein the bottom of the extension is directed towards the bridge of the nose of the wearer, and wherein the proximal end of the left gripping arm, the proximal end of the right gripping arm and the top of the extension form a joint and the bottom of the extension further comprises a hook extending from the bottom of the extension;
(b) placing the pair of pre-existing multifocal lens eyeglass frames on the head of the wearer wherein the frames comprise a bridge and a pair of lenses wherein at least one lens comprises two or more lens powers;
(c) placing the bridge of the pre-existing multifocal lens eyeglass frames on the hook of the device;
(d) moving the hook to adjust the level of the pair of lenses and lens powers.

13. The method of claim 12 wherein the device further comprises a band tip attached to the distal end of the left gripping arm and a band tip attached to the distal end of the right gripping arm.

14. The method of claim 12 wherein the band is comprised of a single piece of flexible material.

15. The device of claim 12 wherein the extension further comprises a length, wherein the length is approximately 3.5 centimeters.

16. A method to adjust a pair of pre-existing multifocal lens eyeglass frames on a head of a wearer, comprising:
   (a) placing an adjustable band adapted to engage the head of the wearer comprising;
      a left gripping arm having a proximal end and a distal end and a right gripping arm having a proximal end and a distal end, wherein the distal end of the right gripping arm and the distal end of the left distal gripping arm grip the head of the wearer without engaging the ears of the wearer, and
      an extension engaging the forehead of the wearer further comprising a top and a bottom wherein the bottom of the extension is directed towards the bridge of the nose of the wearer, and wherein the proximal end of the left gripping arm, the proximal end of the right gripping arm and the top of the extension form a joint and the bottom of the extension further comprises a hook extending from the bottom of the extension;
   (b) placing the pair of pre-existing multifocal lens eyeglass frames on the head of the wearer wherein the frames comprise a bridge and a pair of lenses wherein at least one lens comprises two or more lens powers;
   (c) placing the bridge of the pre-existing multifocal lens eyeglasses on the hook of the device;
   (d) moving the hook to adjust the angle of the pair of lenses and lens powers.

17. The method of claim 16 wherein the device further comprises a band tip attached to the distal end of the left gripping arm and a band tip attached to the distal end of the right gripping arm.

18. The method of claim 16 wherein the band is comprised of a single piece of flexible material.

19. The method of claim 18 wherein the left gripping arm and right gripping arm engage at the joint to form the extension.

20. The device of claim 16 wherein the extension further comprises a length, wherein the length is approximately 3.5 centimeters.

* * * * *